US00RE34058E

United States Patent [19]

Arthur

[11] E Patent Number: Re. 34,058

[45] Reissued Date of Patent: Sep. 8, 1992

[54] MULTILAYER REVERSE OSMOSIS MEMBRANE OF POLYAMIDE-UREA

[75] Inventor: Samuel D. Arthur, Wilmington, Del.

[73] Assignee: E. I. Du Pont de Nemours and Company, Wilmington, Del.

[21] Appl. No.: 784,245

[22] Filed: Oct. 29, 1991

Related U.S. Patent Documents

Reissue of:

[64] Patent No.: 5,019,264
Issued: May 28, 1991
Appl. No.: 560,512
Filed: Jul. 31, 1990

[51] Int. Cl.[5] ..... B01D 71/54; B01D 71/56; B01D 71/60

[52] U.S. Cl. ..... 210/500.37; 210/500.38

[58] Field of Search ..... 210/654, 500.37, 500.38, 210/500.39

[56] References Cited

U.S. PATENT DOCUMENTS 4,366,062 12/1982 Kurihara et al. ..... 210/654

*Primary Examiner*—Frank Sever

[57] ABSTRACT

The present invention is directed to an improved reverse osmosis membrane that shows surprisingly improved solute rejection and permeation properties. The membrane includes a separating layer of a polyamideurea formed in situ by reaction of isocyanate-substituted acyl chloride and a diamine-treated microporous substrate.

17 Claims, No Drawings

MULTILAYER REVERSE OSMOSIS MEMBRANE OF POLYAMIDE-UREA

Matter enclosed in heavy brackets [ ] appears in the original patent but forms no part of this reissue specification; matter printed in italics indicates the additions made by reissue.

FIELD OF THE INVENTION

The present invention relates to composite membranes suitable for use in reverse osmosis processes such as the desalination of aqueous solutions. More particularly, the present invention relates to a multilayer membrane in which one layer is a copolymer of polyamideurea.

BACKGROUND OF THE INVENTION

Reverse osmosis is a well-known process for purification of saline water. In this process, a pressure in excess of the osmotic pressure of the saline water feed solution is applied to the feed solution to separate purified water by use of a semipermeable premselective membrane. Purified water is thereby caused to diffuse through the membrane while salt and other impurities are retained by the membrane.

Permselective membranes include composite membranes that include a separating layer on a supporting microporous substrate. The substrate is typically supported on a support fabric to impart mechanical strength to the membrane. Permselective membranes suitable for use in reverse osmosis are available in various forms and configurations. Flat sheet, tubular and hollow fiber membranes are well-known in the art. These membranes can also vary in morphology. Homogenous and asymmetric membranes are operable, as well as thin film composites.

Permselective membranes are available in the form of multilayer structures that include a separating layer superimposed on a microporous polysulfone substrate layer. Membrane separating layers which may be employed include polyamides, polyphenylene esters, and polysulfonamides.

Polyamide discriminating layers are well-known in the art. The polyamide can be aliphatic or aromatic and may be crosslinked. Polyamide membranes may be made by the interfacial reaction of a cycloaliphatic diamine with isophthaloyl chloride, trimesoyl chloride or mixtures of these acid chlorides. Polyamide membranes also may be made by reaction of m-phenylenediamine and cyclohexane-1,3,5-tricarbonyl chloride. The polyamide discriminating layer also may be made by reaction of aromatic polyamines having at least two primary amines on an aromatic nucleus and aromatic polyfunctional acyl halides having an average of more than two acyl halide groups on an aromatic nucleus.

These prior art membranes have generally been useful as reverse osmosis membranes. These membranes, however, have been prone to deficiencies such as short useful life, low flux, and low salt rejection. A need therefore exists for improved reverse osmosis membranes which show both high rates of salt rejection while providing improved rates of flux.

SUMMARY OF THE INVENTION

The present invention is directed to an improved reverse osmosis membrane that shows surprisingly increased solute rejection and permeation properties. The membrane includes a separating layer of a polyamideurea formed in situ on a microporous support by reaction of an isocyanate-substituted acyl chloride with a diamine.

In accordance with the invention, improved reverse osmosis membranes are made by treating a microporous polymeric substrate with aqueous polyfunctional amine to provide an impregnated substrate. The substrate then is treated with a solution of isocyanate-substituted isophthaloyl chloride in a solvent that is non-reactive with the substrate to provide a membrane of polyamideurea in contact with the substrate.

The resulting membrane's surprisingly improved solute rejection and permeation properties enable the membrane to be employed in a wide variety of applications where high purity permeate is required. Examples of these applications include, but are not limited to, desalination of salt water, semiconductor manufacturing, reduction of BOD in waste water treatment, removal of dissolved salts during metal recovery, dairy processing such as milk processing, fruit juice concentration, and de-alcoholization of wine, beer, and the like. In such applications, the liquid is placed under pressure while in contact with the improved membranes of the invention to remove impurities.

DETAILED DESCRIPTION OF THE INVENTION

Having briefly summarized the invention, the invention will now be described in detail by reference to the following specification and non-limiting examples. Unless otherwise specified, all percentages are by weight and all temperatures are in degrees centigrade.

Generally, the manufacture of the improved reverse osmosis membranes of the invention is accomplished by treating a microporous polymeric substrate with a solution of an aqueous polyfunctional amine, preferably a polyfunctional aromatic amine, and further treating the substrate with a solution of an isocyanate-substituted acyl chloride, such as 2-isocyanatoisophthaloyl chloride, 4-isocyanatoisophthaloyl chloride, 5-isocyanatoisophthaloyl chloride, 2-isocyanatoterephthaloyl chloride, 3,5-diisocyanatobenzyoyl chloride, 5-isocyanatocyclohexane-1,3-dicarbonyl chloride and 5-isocyanatoisophthaloyl bromide, preferably, 5-isocyanatoisophthaloyl chloride. The reaction of the isocyanate-substituted acyl chloride with the polyfunctional aromatic amine provides a novel composition of a polyamideurea that shows both surprisingly improved solute rejection and improved solvent flux.

Generally, isocyanate-substituted isophthaloyl chlorides may be prepared by reacting an amino-substituted isophthalic acid, or salts of amino-substituted isophthalic acid, catalyst, phosgene, and halogenated aliphatic solvent under elevated pressure and temperature. The 5-isocyanatoisophthaloyl chloride (ICIC) that is most preferably reacted with the diamine treated substrate is prepared by heating a mixture of 10 grams of 5-aminoisophthalic acid, a catalyst of 0.5 grams of imidazole, 60 grams of phosgene, and 50 ml of chlorobenzene solvent in a pressure vessel at 160° C. for 18 hours at under autogenous pressure. Removal of the solvent, followed by distillation of the product at 123°-128° C. and 0.2 mm Hg yields 8.8 grams of ICIC.

ICIC also may be produced by using alternatives to the preferred reactants mentioned above. For example, salts of 5-aminoisophthalic acid such as disodium 5-aminoisophthalate or 5-aminoisophthalic acid hydrochloride may be substituted for 5-aminoisophthalic acid. Similarly, imidazole may be replaced with other heteroatom-containing compounds capable of complexing phosgene. Examples of such catalysts include, but are not limited to pyridine, N,N-dimethylformamide (DMF), N,N-dimethylacetamide (DMAc) and the like. Likewise, solvents such as dioxane or methylene chloride may be employed, so long as the solvent is reasonably unreactive with the reactants and products.

ICIC is most preferred as the isocyanato-substituted isophthaloyl chloride for reacting with the diamine-treated substrate to effect interfacial polymerization of polyamideurea. However, analogs such as 5-isocyanatoisophthaloyl bromide may be substituted for ICIC. Additionally, homologs such as 3,5-diisocyanatobenzoyl chloride and positional isomers of ICIC such as 4-isocyanatoisophthaloyl chloride may be substituted for ICIC. Aliphatic analogs, such as 5-isocyanatocyclohexane-1,3-dicarbonyl chloride may be employed as well. Also isocyanate-substituted isophthaloyl chloride may be employed in combination with a difunctional isocyanate to effect polymerization with a diamine to yield polyamideurea; 2,4-toluenediisocyanate is one example of such a diisocyanate. The isocyanate-substituted isophthaloyl chloride also may be employed in combination with a diacyl chloride to effect polymerization with a diamine to provide polyamideurea. Isophthaloyl chloride is an example of such a diacyl chloride.

Generally, the membranes of the present invention can be manufactured by first casting a suitable substrate for the membrane onto a support member. Suitable substrate layers have been described extensively in the art. Illustrative substrate materials include organic polymeric materials such as polysulfone, polyethersulfone, chlorinated polyvinyl chloride, styrene/acrylonitrile copolymer, polybutylene terephthalate, cellulose esters and other polymers which can be prepared with a high degree of porosity and controlled pore size distribution. These materials are generally cast onto a support of non-woven fabric or woven cloth, generally of polyester or polypropylene. Preferably, polysulfone is employed as the substrate. Porous inorganic materials also may be employed as the support material. Examples of such support compositions include porous glass, ceramics, sintered metals, and the like. These supports may be in the form of flat sheets, hollow tubes, hollow fibers, and the like to provide, for example, hollow fiber membranes.

Preparation of microporous polysulfone substrate films is well known in the art. Preparation includes casting a 15–20% solution of polysulfone in dimethylformamide (DMF) onto a glass plate, followed immediately by immersing the cast polysulfone into water to produce the polysulfone film. The side of the polysulfone film exposed to air during casting is called the "face" and contains very small pores, mostly under 200 angstroms in diameter. The "back" of the film in contact with the glass plate has very coarse pores.

After casting, the porous polysulfone substrate is treated with an aqueous solution of a polyfunctional diamine. Aqueous m-phenylenediamine (MPD) is preferred for treating the substrate. However, other diamines with sufficient water solubility to effect interfacial polymerization with isocyanato-substituted phthaloyl chlorides also may be employed. Examples of diamines include, but are not limited to, p-phenylenediamine, piperazine, m-xylylenediamine, and the like.

In the following, illustrative examples, the microporous polysulfone substrate is exposed to an aqueous solution of m-phenylenediamine (MPD) of indicated weight/volume (w/v) percent concentration at a temperature of 20° C. for 5 minutes. Advantageously 0.5 to 3% by weight, and most advantageously 1 to 2% by weight of aqueous MPD is employed. After exposure, the substrate is removed from the MPD solution, drained, and excess MPD solution removed via a rubber roller. The MPD-treated polysulfone substrate then is dipped into a solution of ICIC in a water-immiscible solvent under conditions suitable for effecting interfacial polymerization of polyamideurea of the general formula:

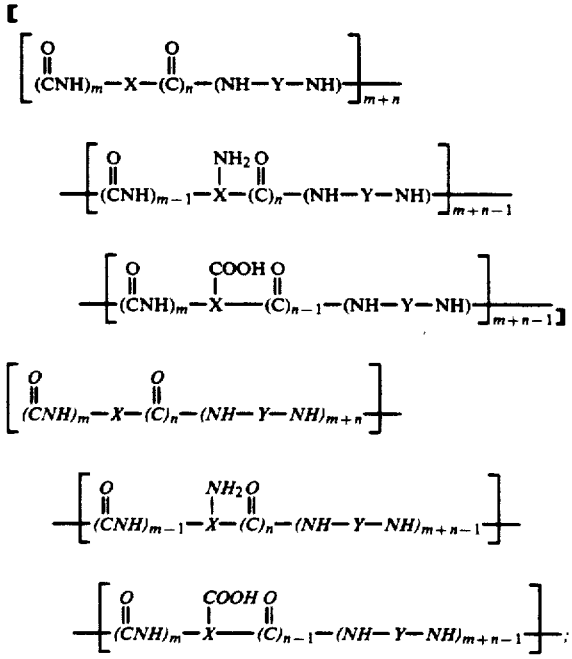

where m, n>0, m+n≧3,

X=an (m+n)-valent organic group, and

Y=a divalent organic group.

Suitable solvents are solvents which do not deleteriously affect the substrate. Examples of solvents include, but are not limited to $C_5$–$C_8$ n-alkanes, $C_5$–$C_8$ fluoroalkanes, $C_2$–$C_8$ chlorofluoroalkanes, $C_6$–$C_8$ cyclo alkanes, $C_4$–$C_8$ cyclo fluoroalkanes, and $C_4$–$C_8$ cyclo chlorofluoro alkanes. Freon TF (1,1,2-trichlorotrifluoroethane) is the preferred solvent for use in the ICIC solution.

The concentration of the ICIC in the solution may vary depending on the specific solvent, substrate, and the like, and can be determined experimentally. Generally, concentrations of 0.03 to 5.0%, preferably 0.05 to 0.15 percent, can be employed.

After formation of the polyamideurea layer, the resulting membrane is removed from the ICIC solution and drip dried for 3 to 120 seconds, preferably 60 to 120 seconds, most preferably for 120 seconds. The membrane then is treated to extract impurities such as residual diamines, reaction by-products, residual ICIC, and the like. This is accomplished by exposing the membrane to water and then to aqueous lower alkanols. Water extraction is accomplished with running tap water at 20° to 60° C., preferably 40° to 60° C., most preferably 40°–45° C. for 1 to 20 minutes, preferably 5 to 10 minutes, most preferably 10 minutes. The aqueous lower alkanols are preferably $C_1$–$C_3$ alkanols such as methanol, ethanol, isopropanol, and the like. The aqueous ethanol employed may be 5 to 25 percent ethanol, preferably 10 to 15 percent ethanol, most preferably 15 percent ethanol, the remainder being water. Generally, the aqueous ethanol is at 20° to 60° C., preferably 40° to 50° C., most preferably 50° C. The exposure time of the membrane to aqueous ethanol is 1 to 20 minutes, preferably 5 to 10 minutes, most preferably 10 minutes. The membrane then is rinsed with water to remove residual ethanol and is stored in deionized water until testing. Alternatively, the membrane may be impregnated with a wetting agent such as glycerine to provide for dry storage and subsequent rewetting.

The resulting membranes of polyamideurea on a polysulfone substrate are evaluated for salt rejection and flux by subjecting the membranes to a feed of aqueous 0.26%–0.28% NaCl at pH 6.8 and 25°–30° C. in a cross flow permeation cell. Membranes measuring 47 mm diameter are placed into the cell and exposed to 0.75 liters/minute of aqueous NaCl solution. The membranes are exposed to feed pressure of 420 psig for at least 14 hours, after which the feed pressure is lowered to 225 psig and the permeation properties determined.

The performance of the membrane is characterized in terms of the percent of salt NaCl rejected (R), permeability (Kw), and permeate productivity. The percent salt rejected (R) is defined as $$R=(1-(C_p/C_f)\cdot 100\%$$

where $C_p$ and $C_f$ are the concentrations of NaCl in the permeate and feed, respectively. The concentrations of the NaCl in the permeate and feed can be determined conductimetrically with a Beckman Gl conductivity cell (cell constant 1.0) and a YSI Model 34 conductivity meter.

The permeability (Kw) is defined as (flux/effective pressure), where flux is the flow rate of water through the membrane, and the effective pressure is equal to the feed pressure minus the opposing osmotic pressure. Flux is expressed in terms of permeate productivity, that is, in terms of gallons of permeate/square foot membrane area/day (gfd) at 225 psig and 25° C. Permeability is expressed in terms of meters/second/teraPascal ($m/s/Pa\times 10^{-12}$). Conversion, expressed as volume of permeate per unit time divided by volume of feed per unit time is typically below 2%.

The membranes of the invention can be readily tailored to a specific application such as salt removal from drinking water, dairy processing, and the like by varying, for example, the concentration of the isocyanate substituted acyl halide employed to treat the diamine treated substrate. Accordingly, polyamideurea layers may be formed that are suitable for achieving salt rejections below 90 percent to more than 99 percent.

The membranes can be employed in a variety of devices known in the prior art. For example, flat sheets of the membrane can be utilized in either plate and frame, or spiral devices. Tubular and hollow fiber membranes can be assembled in generally parallel bundles in devices with tubesheets at opposing ends of the membranes. Radial, axial or down the bore flow feed can be utilized in hollow fiber devices.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth in degrees centigrade; unless otherwise indicated, all parts and percentages are by weight.

EXAMPLE 1–8

A microporous polysulfone substrate is prepared by knife casting a 16% solution of UDEL P3500 polyethersulfone, supplied by Union Carbide Corp. in N,N-dimethylformamide (DMF) containing 0.3% water onto a support of polyester sailcloth. The solution is cast at a knife clearance of 5.5 mil. The sailcloth bearing the cast polyethersulfone solution is immersed in a water bath within two seconds of casting to produce a microporous polysulfone substrate. The substrate is washed in water to remove the N,N-dimethylformamide and is stored damp until use.

The microporous polysulfone substrate is immersed in an aqueous solution of MPD for five minutes. The substrate is drained briefly and then excess MPD droplets are removed by rolling the face of the substrate with a soft rubber roller. The damp MPD-impregnated substrate then is immersed in a solution of 5-isocyanatoisophthaloyl chloride in FREON TF solvent for 40 seconds to form a membrane of polyamideurea.

The membrane is removed from the ICIC solution and drip dried for 2 minutes. The membrane then is successively treated in 45° C., running tap water for ten minutes, and then in stirred 15% aqueous ethanol at 50° C. for 10 minutes. The membrane is stored in water containing 0.1% sodium bicarbonate until testing for permeability and flux.

The performance of membranes of examples 1–8 is reported in Table 1.

TABLE 1

| Example # | MPD Conc % | ICIC Conc % | % NaCl Rejection | Permeability Kw (m/s/TPa) | Productivity (gfd @ 225 psig) |
|---|---|---|---|---|---|
| 1 | 1.00 | 0.05 | 99.22 | 6.62 | 19.0 |
| 2 | 1.50 | 0.05 | 99.34 | 5.41 | 15.5 |
| 3 | 2.00 | 0.05 | 99.33 | 8.66 | 24.8 |
| 4 | 1.00 | 0.15 | 99.06 | 3.16 | 9.0 |
| 5 | 1.00 | 0.10 | 98.99 | 4.46 | 12.8 |
| 6 | 1.50 | 0.10 | 99.44 | 5.86 | 16.8 |
| 7 | 2.00 | 0.15 | 99.42 | 3.66 | 10.5 |
| 8 | 1.50 | 0.15 | 99.22 | 2.92 | 8.4 |

EXAMPLE 9–12

Examples 9–12 describe the use of n-hexane as the solvent for ICIC instead of FREON TF; all other conditions are identical to Examples 1–8. The results are reported in Table 2.

TABLE 2

| Example # | MPD Conc % | ICIC Conc % | % NaCl Rejection | Permeability Kw (m/s/TPa) | Productivity (gfd @ 225 psig) |
|---|---|---|---|---|---|
| 9 | 1.00 | 0.05 | 99.27 | 4.14 | 11.8 |
| 10 | 1.50 | 0.05 | 99.22 | 4.77 | 13.6 |
| 11 | 2.00 | 0.05 | 99.18 | 5.68 | 16.2 |

TABLE 2-continued

| Example # | MPD Conc % | ICIC Conc % | % NaCl Rejection | Permeability Kw (m/s/TPa) | Productivity (gfd @ 225 psig) |
|---|---|---|---|---|---|
| 12 | 1.50 | 0.15 | 99.49 | 3.55 | 10.1 |

EXAMPLES 13-14

Examples 13-14 show the utility of the membranes of the invention for removing dissolved silica from the feed solution. In Examples 13-14, the amount of rejection of dissolved silica is determined for the membranes of Examples 3 and 6 by adding 170 ppm of sodium metasilicate nonahydrate to the 0.27% NaCl feed to give 36 ppm dissolved silica. Silica rejection is determined at 225 psig as described above for NaCl rejection. Silica concentration in the feed and permeate is determined by Method B of ASTM D 859. The results are given in Table 3.

TABLE 3

| Example # | Membrane of Example | Silica Rejection (%) |
|---|---|---|
| 13 | 3 | 99.59 |
| 14 | 6 | 99.39 |

EXAMPLES 15-16

These examples illustrate the effect of feed pH on % NaCl and % silica rejection. The effect of feed pH is determined for the membranes of Examples 3 and 6 by adjusting the pH of a 0.27% NaCl/36 ppm $Si_2$ feed solution with HCl and NaOH. The results are given in Table 4.

TABLE 4

| Example # | Membrane of Example # | Feed pH 6.8 NaCl Rej % | Feed pH 6.8 $SiO_2$ Rej % | Feed pH 4.1 NaCl Rej % | Feed pH 4.1 $SiO_2$ Rej % | Feed pH 4.9 NaCl Rej % | Feed pH 7.4 NaCl Rej % |
|---|---|---|---|---|---|---|---|
| 15 | 3 | 99.52 | 99.59 | 92.52 | 99.56 | 98.00 | 99.48 |
| 16 | 6 | 99.46 | 99.39 | 91.46 | 99.47 | 97.46 | 99.49 |

EXAMPLE 17

This example illustrates the surprising effectiveness of the membranes of the invention for desalination of seawater. In Example 17, the suitability of the membrane of Example 3 for seawater desalination is determined by changing the feed to 3.8% NaCl, pH 7 at 800 psig. The result is shown in Table 5.

TABLE 5

| Membrane of Example # | NaCl Rejection | Permeability Kw (m/s/TPa) | Productivity (gfd @ 800 psig) |
|---|---|---|---|
| 3 | 99.28% | 3.62 | 18.5 |

EXAMPLES 18-20

Examples 18-20 show treatment of a polysulfone substrate with other aromatic amines that can serve to interfacially react with ICIC to produce the membranes of the invention. Table 6 describes membranes treated with p-phenylenediamine (PPD) that are contacted with ICIC. The membranes are made under the conditions employed in Examples 1-8 except that PPD is substituted for MPD. The performance of these membranes is given in Table 6.

TABLE 6

| Example # | PPD Conc % | ICIC Conc % | % NaCl Rejection | Permeability Kw (m/s/TPa) | Productivity (gfd @ 225 psig) |
|---|---|---|---|---|---|
| 18 | 1.0 | 0.10 | 99.13 | 3.31 | 9.4 |
| 19 | 1.5 | 0.10 | 99.01 | 4.40 | 12.5 |
| 20 | 2.0 | 0.10 | 98.92 | 4.60 | 13.0 |

EXAMPLES 21-23

These examples show the use of polyacyl halides in combination with ICIC to make the membranes of the invention. Table 7 describes membranes formed by treating an MPD-impregnated substrate made with 1:1 mixture of ICIC and 1,3,5-cyclohexanetricarbonyl chloride (CHTC) under the general conditions of Examples 1-8. The performance of the resulting membranes is given in Table 7.

TABLE 7

| Example # | MPD Conc % | ICIC Conc % | CHTC Conc % | % NaCl Rejection | Permeability Kw (m/s/TPa) | Productivity (gfd @ 225 psig) |
|---|---|---|---|---|---|---|
| 21 | 1.0 | 0.05 | 0.05 | 98.62 | 8.4 | 23.9 |
| 22 | 1.5 | 0.05 | 0.05 | 98.95 | 9.2 | 26.1 |
| 23 | 2.0 | 0.05 | 0.05 | 99.17 | 8.3 | 23.5 |

EXAMPLES 24-26

These examples show that diacyl chlorides can be employed in combination with ICIC to form the membranes of the invention. Table 8 describes the performance of membranes made by treating an MPD impregnated polysulfone substrate with a 1:1 (wt) mixture of ICIC and isophthaloyl chloride (IC) under the conditions of Examples 1-8. The molar ratio of (ICIC:IC) in the mixture is 1:1.2, and the average functionally of the mixture is 2.45. The performance of the resulting membrane are shown in Table 8.

TABLE 8

| Example # | MPD Conc % | ICIC Conc % | IC Conc % | % NaCl Rejection | Permeability Kw (m/s/TPa) | Productivity (gfd @ 225 psig) |
|---|---|---|---|---|---|---|
| 24 | 1.0 | 0.05 | 0.05 | 98.73 | 4.9 | 14.0 |
| 25 | 1.5 | 0.05 | 0.05 | 99.56 | 5.5 | 15.6 |
| 26 | 2.0 | 0.05 | 0.05 | 98.68 | 5.9 | 16.7 |

EXAMPLES 27-28

Examples 27 and 28 show the use of other aromatic diamines for treating the polysulfone substrate to provide a substrate that can be interfacially reacted with ICIC to make the polyamideurea membranes of the invention. In examples 27 and 28, piperazine and m-xylylenediamine are each substituted for MPD, respectively. ICIC is then reacted with the resulting substrate under the conditions of Examples 1-8. The diamines employed to treat the polysulfone substrate contain 1% triethylamine as an acid acceptor and 0.5% sodium lauryl sulfate as a surfactant. Table 9 describes the performance of these membranes.

TABLE 9

| Exple # | Amine Conc % | ICIC Conc % | % NaCl Rejection | Permeability Kw (m/s/TPa) | Productivity (gfd @ 225 psig) |
|---|---|---|---|---|---|
| 26 | piperazine 1.0 | 0.10 | 54.76 | 24.2 | 73.8 |
| 27 | m-xylylenediamine 3.0 | 0.10 | 49.57 | 0.5 | 1.6 |

EXAMPLES 29-31

These examples show that difunctional isocyanates can be combined with ICIC to make the membranes of the invention. Table 10 describes the performance of membranes made by treating an MPD-impregnated polysulfone substrate with a 1:1 mixture of ICIC and toluene diisocyanate (TDI) under the conditions of Examples 1-8, except that exposure time of the MPD-treated substrate to the mixture of (ICIC/TDI) is 2 minutes, and the drying time after (ICIC/TDI) treatment is 10 minutes before extraction. The molar ratio of (ICIC:TDI) in the mixture is 1:1.4, and the average functionality of the mixture is 2.42.

TABLE 10

| Example # | MPD Conc % | ICIC Conc % | TDI Conc % | % NaCl Rejection | Permeability Kw (m/s/TPa) | Productivity (gfd @ 225 psig) |
|---|---|---|---|---|---|---|
| 29 | 1.0 | 0.05 | 0.05 | 99.40 | 4.5 | 12.6 |
| 30 | 1.5 | 0.05 | 0.05 | 99.67 | 4.5 | 12.7 |
| 31 | 2.0 | 0.05 | 0.05 | 99.48 | 5.1 | 14 |

The presence of both the isocyanate and acyl chloride functionality in the monomer employed to treat the diamine impregnated substrate is necessary to make a reverse osmosis membrane with the salt rejection properties of the membranes of the invention. The importance of these functionalities is demonstrated by Examples 32 and 33 in which MPD is interfacially polymerized with 2,4-toluenediisocyanate (TDI) and with isophthaloyl chloride (IC), respectively.

EXAMPLES 32-33

In examples 32-33, the conditions of Examples 1-8 are employed, except the time of exposure containing the MPD-treated substrate to the FREON TF solution of the second reactant is 30 seconds; also, no aqueous ethanol extraction is performed on the finished membrane. The results are shown in Table 11.

TABLE 11

| Example # | MPD Conc % | TDI Conc % | IC Conc % | % NaCl Rejection | Permeability Kw (m/s/TPa) | Productivity (gfd @ 225 psig) |
|---|---|---|---|---|---|---|
| 32 | 2.0 | 0.1 | — | 15.87 | 30.4 | 100 |
| 33 | 2.0 | — | 0.1 | 22.88 | 16.6 | 54 |

EXAMPLES 34-37

These examples demonstrate that homologs of ICIC containing two isocyanato groups and one acyl chloride group, namely, 3,5-diisocyanatobenzoyl chloride (DIBC), will react interfacially with an aromatic diamine to make the polyamideurea membranes of this invention. The conditions of Examples 1-8 are employed, except that aqueous ethanol extraction is not performed on the finished membrane. The results are shown in Table 12.

TABLE 12

| Example # | MPD Conc % | DIBC Conc % | % NaCl Rejection | Permeability Kw (m/s/TPa) | Productivity (gfd @ 225 psig) |
|---|---|---|---|---|---|
| 34 | 2.0 | 0.15 | 98.57 | 1.40 | 3.9 |
| 35 | 1.0 | 0.15 | 98.91 | 1.03 | 2.9 |
| 36 | 2.0 | 0.10 | 99.13 | 1.28 | 3.6 |
| 37 | 1.0 | 0.10 | 98.50 | 0.99 | 2.8 |

Comparative Examples 1–4

The surprising efficacy of the mixed isocyanate-substituted acyl chloride which results in the polyamideurea of this invention is revealed in comparative Examples 1–4 in which 1,3,5-triisocyanatobenzene (TIB) is reacted interfacially with MPD to form a polyurea membrane. It is readily seen that the water flux and salt rejection of the polyurea membrane are inferior to the properties of the polyamideurea membrane of the invention. The conditions of Examples 1–8 are employed, except no aqueous ethanol extraction is performed on the finished membrane.

| Example # | MPD Conc % | [DIBC] *TIB* Conc % | % NaCl Rejection | Permeability Kw (m/s/TPa) | Productivity (gfd @ 225 psig) |
|---|---|---|---|---|---|
| 1 | 1.0 | 0.10 | 96.80 | 0.26 | 0.7 |
| 2 | 2.0 | 0.10 | 97.96 | 0.26 | 0.7 |
| 3 | 1.0 | 0.15 | 95.08 | 0.36 | 1.0 |
| 4 | 2.0 | 0.15 | 96.47 | 0.24 | 0.7 |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A reverse osmosis membrane that shows improved salt rejection, flux, and productivity, comprising a polyamideurea separating layer in contact with a [polysulfone] substrate, wherein said polyamideurea comprises the formula:

$$[\,[(\overset{O}{\overset{\|}{C}}NH)_m-X-(\overset{O}{\overset{\|}{C}})_n-(NH-Y-NH)-]_{(m+n-)}$$

$$-[(\overset{O}{\overset{\|}{C}}NH)_{(m-1)}-\overset{NH_2}{\overset{|}{X}}-(\overset{O}{\overset{\|}{C}})_n-(NH-Y-NH)]_{(m+n-1)}-$$

$$-[(\overset{O}{\overset{\|}{C}}NH)-\overset{COOH}{\overset{|}{X}}-(\overset{O}{\overset{\|}{C}})_{(n-1)}-(NH-Y-NH)]_{(m+n-1)}]$$

$$\left[(\overset{O}{\overset{\|}{C}}NH)_m-X-(\overset{O}{\overset{\|}{C}})_n-(NH-Y-NH)_{m+n}\right]-$$

-continued $$-\left[(\overset{O}{\overset{\|}{C}}NH)_{m-1}-\overset{NH_2}{\overset{|}{X}}-(\overset{O}{\overset{\|}{C}})_n-(NH-Y-NH)_{m+n-1}\right]-$$

$$-\left[(\overset{O}{\overset{\|}{C}}NH)_m-\overset{COOH}{\overset{|}{X}}-(\overset{O}{\overset{\|}{C}})_{n-1}-(NH-Y-NH)_{m+n-1}\right]-;$$

where $m,n>0$, $m+n\geqq 3$,

X = a (m+n) valent organic group, and

Y = a divalent organic group.

2. The membrane of claim 1 wherein said membrane has a percent salt rejection of at least about 90%.

3. The membrane of claim 1 wherein said membrane has a percent salt rejection of at least about 99%.

4. The membrane of claim 1 further comprising a support member for support said substrate having said separating layer thereon.

5. The membrane of claim 4 wherein said support member is selected from the group of porous glass, sintered metal, ceramics, polyolefins, polyesters, and polyamides.

6. The membrane of claim 3 wherein said support member is polyester.

7. The membrane of claim 1 wherein said membrane is in the form of a hollow fiber.

*8. The membrane of claim 1 wherein said substrate is a microporous substrate.*

*9. The membrane of claim 8 wherein said polyamideurea is the reaction product of monoisocyanate-substituted aromatic diacyl halide and an aromatic diamine.*

*10. The membrane of claim 8 wherein said polyamideurea is the reaction product of* 1,3,5-substituted monoisocyanato isophthaloyl halide and meta or paraphenylenediamine.

*11. The membrane of claim 8 wherein said polyamideurea is the reaction product of ICIC and metaphenylenediamine.*

*12. The membrane of claim 8 wherein said polyamideurea is the reaction product of a diisocyanate-substituted aromatic acyl halide and an aromatic diamine.*

*13. The membrane of claim 1 wherein said substrate is made of polysulfone.*

*14. The membrane of claim 1 wherein X is a trivalent organic group.*

*15. The membrane of claim 14 wherein Y is a divalent meta- or para-substituted benzene group.*

*16. The membrane of claim 15 wherein X is a* 1,3,5-substituted benzene group.

*17. The membrane of claim 8 wherein said polyamideurea is the reaction product of a trivalent, isocyanate-substituted acyl halide and a divalent cyclic amine.*

* * * * *